United States Patent
Ramesh et al.

(10) Patent No.: US 12,135,712 B2
(45) Date of Patent: Nov. 5, 2024

(54) SYSTEM AND METHOD FOR SHARING DATABASE QUERY EXECUTION PLANS BETWEEN MULTIPLE PARSING ENGINES

(71) Applicant: Teradata US, Inc., Dayton, OH (US)

(72) Inventors: Bhashyam Ramesh, Secunderabad (IN); Mohan Kumar KJ, Hyderabad (IN); J Venkata Ramana, Hyderabad (IN); Anitha G, TamilNadu (IN); Karan Kaur Phull, Noida (IN)

(73) Assignee: Teradata US, Inc., San Diego, CA (US)

( * ) Notice: Subject to any disclaimer, the term of this patent is extended or adjusted under 35 U.S.C. 154(b) by 49 days.

(21) Appl. No.: 16/236,738

(22) Filed: Dec. 31, 2018

(65) Prior Publication Data
US 2020/0151178 A1     May 14, 2020

Related U.S. Application Data

(60) Provisional application No. 62/760,577, filed on Nov. 13, 2018.

(51) Int. Cl.
*G06F 16/20*     (2019.01)
*G06F 16/2453*     (2019.01)
*G06F 16/2455*     (2019.01)

(52) U.S. Cl.
CPC .. *G06F 16/24542* (2019.01); *G06F 16/24532* (2019.01); *G06F 16/24552* (2019.01)

(58) Field of Classification Search
None
See application file for complete search history.

(56) References Cited

U.S. PATENT DOCUMENTS

| | | | |
|---|---|---|---|
| 9,002,824 B1* | 4/2015 | Sherry | G06F 16/2471 |
| | | | 707/718 |
| 10,754,813 B1* | 8/2020 | Sorenson, III | G06F 17/40 |
| 11,086,869 B1* | 8/2021 | Aleti | G06F 16/24542 |
| 2008/0022136 A1* | 1/2008 | Mattsson | G06F 21/6227 |
| | | | 713/194 |
| 2010/0306188 A1* | 12/2010 | Cunningham | G06F 16/24542 |
| | | | 707/713 |
| 2011/0029508 A1* | 2/2011 | Al-Omari | G06F 16/24542 |
| | | | 707/718 |
| 2012/0084315 A1* | 4/2012 | Schneider | G06F 16/24545 |
| | | | 707/769 |

(Continued)

*Primary Examiner* — Jau Shya Meng
(74) *Attorney, Agent, or Firm* — Randy L. Campbell, Jr.

(57) ABSTRACT

Techniques for improving the execution of database queries in a multi-processor system or distributed processing system environment are provided. In a database system including multiple parsing engines (PEs) for parsing database queries, or requests, received by the system and generating execution plans for the requests, execution plans generated for requests can be saved in a global request cache accessible to each of the parsing engines. Requests which have been parsed and cached by a PE can be retrieved for use by other PEs, thereby avoiding unnecessarily parsing the same database request in multiple PEs. The global request cache may be a distributed cache consisting of request caches local to each parsing engine, with execution plans allocated to the local request caches using hashing techniques applied to the database requests associated with the execution plans.

6 Claims, 4 Drawing Sheets

FLOW FOR RETRIEVING PLAN FROM TARGET PARSING ENGINE

Flow 1, If target PE is same PE: 1->2->3->4
Flow 2, If target PE is some other PE: 1->5->6->7->8->4

(56) References Cited

U.S. PATENT DOCUMENTS

| | | | |
|---|---|---|---|
| 2013/0159286 A1* | 6/2013 | Manzano Macho | G06F 16/24552 707/718 |
| 2013/0198231 A1* | 8/2013 | Skidanov | G06F 16/2471 707/770 |
| 2013/0198333 A1* | 8/2013 | Nakamura | H04L 29/0809 709/217 |
| 2016/0078101 A1* | 3/2016 | Somaiya | G06F 16/3322 707/706 |
| 2016/0364447 A1* | 12/2016 | Chen | G06F 16/2453 |
| 2017/0329835 A1* | 11/2017 | Lee | G06F 9/466 |
| 2018/0189349 A1* | 7/2018 | Sirohi | G06F 16/24539 |
| 2018/0285416 A1* | 10/2018 | Bestfleisch | G06F 16/24552 |
| 2019/0324653 A1* | 10/2019 | Chopra | G06F 3/0659 |
| 2019/0362011 A1* | 11/2019 | Oks | G06F 16/24552 |

* cited by examiner

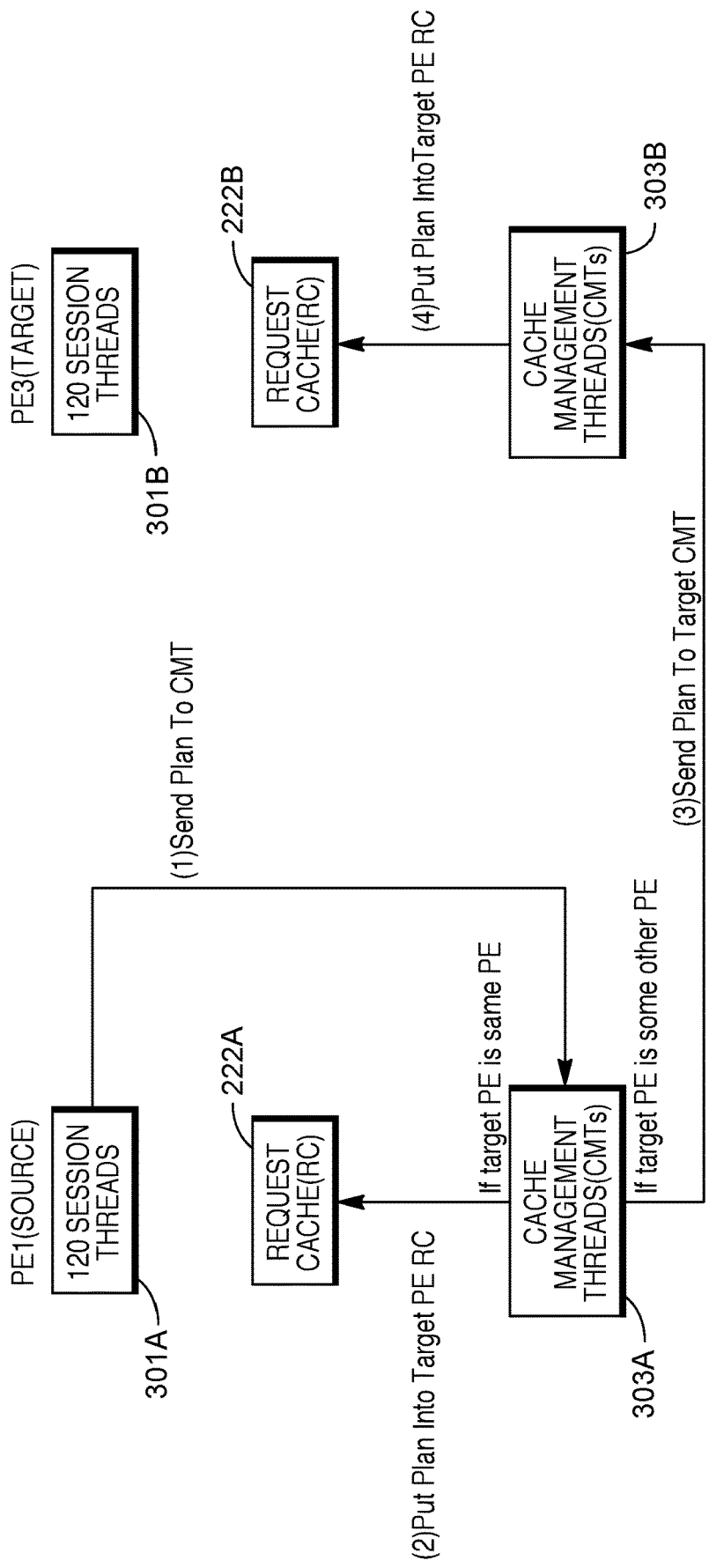

SYSTEM AND METHOD FOR SHARING DATABASE QUERY EXECUTION PLANS BETWEEN MULTIPLE PARSING ENGINES

CROSS REFERENCE TO THE RELATED APPLICATIONS

This application claims priority under 35 U.S.C. § 119(e) to the following commonly-assigned patent application, which is incorporated herein by reference: U.S. Provisional Patent Application No. 62/760,577, entitled "Partitioned Global Request Cache," filed on Nov. 13, 2018, by Bhashyam Ramesh, Mohan Kumar K J, J. Venkata Ramana, Anitha G, and Karan Kaur Phull.

BACKGROUND OF THE INVENTION

Distributed database systems, such as systems provided by Teradata Corporation, include a combination of software components (e.g., computer program routines, subroutines, applications, etc.) and hardware (e.g., processors, memory, etc.) components. These components may be organized into multiple processing nodes or processing units. The database system may include multiple parsing engines (PEs) for parsing database requests, or queries, received by the system and generating execution plans for the requests. If the same request is submitted repeatedly, plans of requests can be saved in a request cache (RC) which is maintained for each parsing engine to avoid parsing of the same request multiple times.

Currently, request caches are local to each processing engine, and if a request has previously been parsed and cached by one PE, other PEs cannot use the cached plan and must parse the request anew when received by one of the other PEs.

Described herein, is a system and method for sharing query plans saved in the request cache of one PE with other PEs, thereby avoiding unnecessarily parsing the same database request in multiple PEs.

BRIEF DESCRIPTION OF THE DRAWINGS

The present invention will be readily understood by the following detailed description in conjunction with the accompanying drawings, wherein like reference numerals designate like structural elements, and in which:

FIG. 4 provides a diagrammatic representation a structure and process for storing a query execution plan within the global request cache, in accordance with the invention.

DETAILED DESCRIPTION OF THE INVENTION

Figure 1:
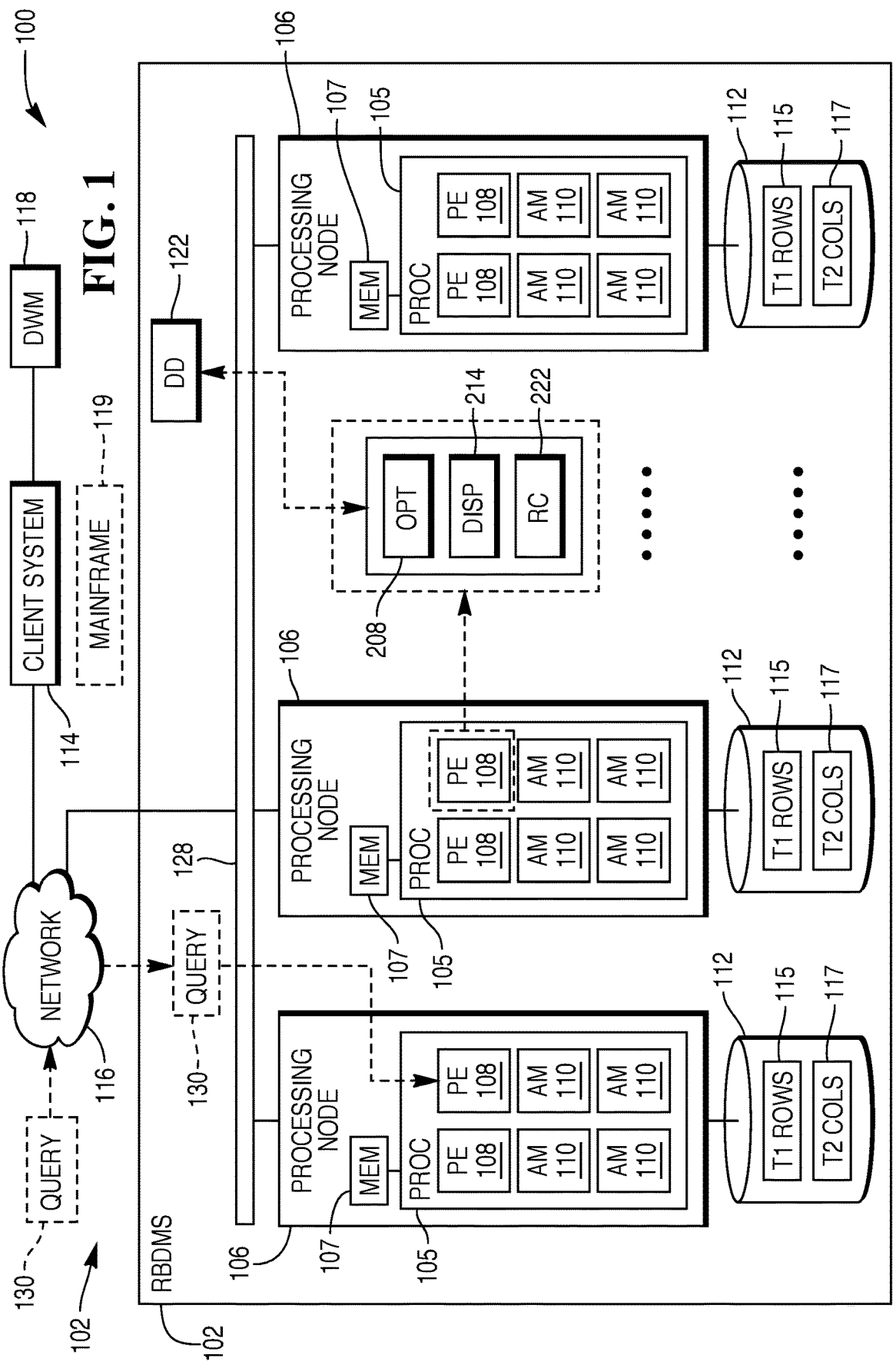
FIG. 1 is a block diagram of an example distributed relational database system.

FIG. 1 is a diagrammatic representation of an example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPS), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 105 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 112. In one example, the database system 100 may be configured to distribute rows across access modules 110 and their associated DSFs 112 in accordance with their primary index. The primary index distributes the records in a table across the AMPs, by hashing the columns that make up the primary index to determine which records go to which AMP.

For an access module 110, rows of each stored table may be stored across multiple DSFs 112, such as in rows 115 of table T1 or in columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 208 to assess the best plan for execution of the query. An example of an optimizer module 208 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 204 (see FIG. 2), and/or optimizer module 208 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Figure 2:
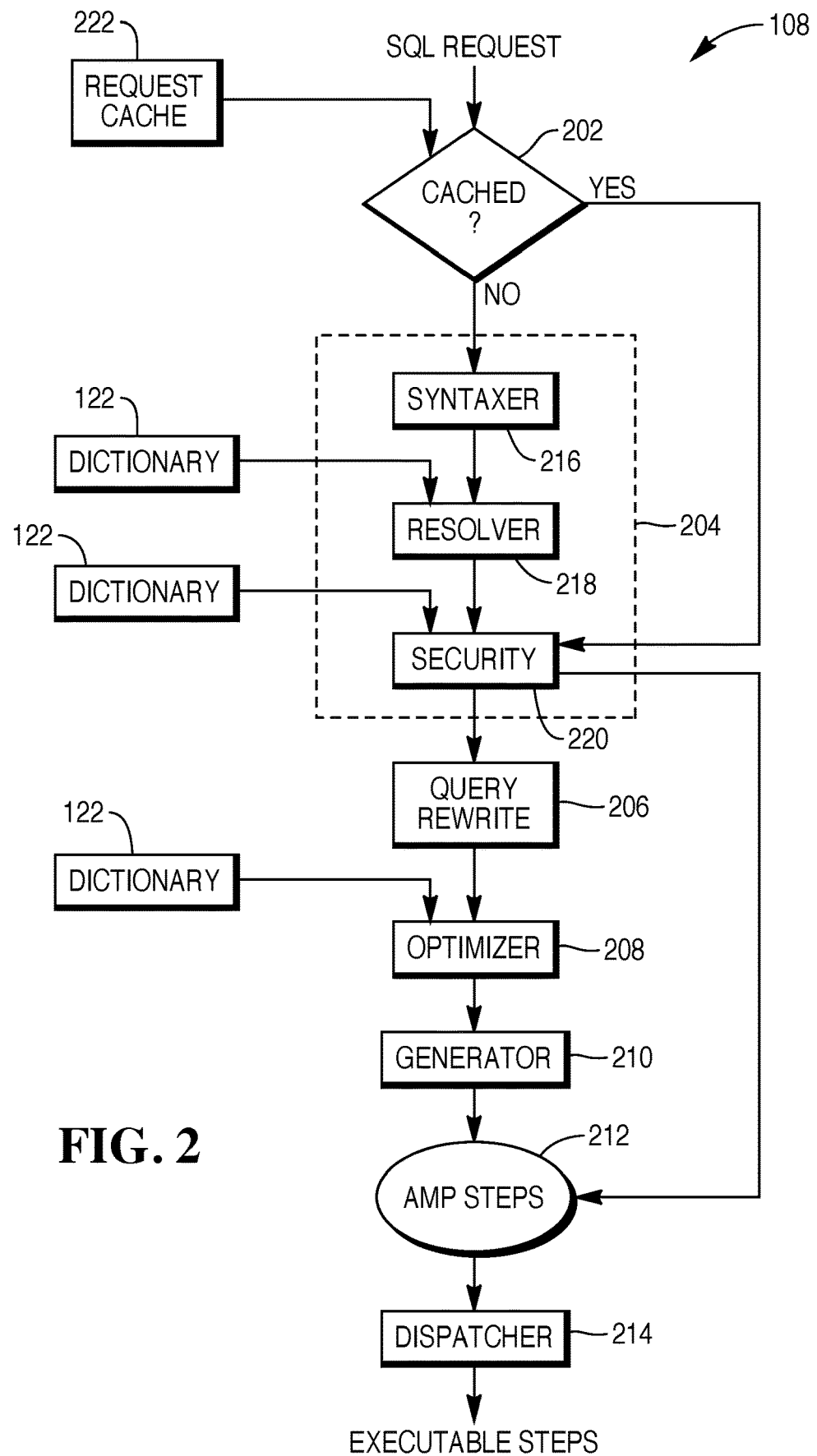
FIG. 2 is a block diagram of a parsing engine 108 employed within the example database system of FIG. 1 to generate a query execution plan for a received database request.

FIG. 2 is a block diagram of a parsing engine 108 employed within the example database system of FIG. 1. In the example, each parsing engine module 108 includes the following primary components: a parser 204, a query rewriter 206, optimizer 208, a steps generator 210, and a dispatcher 214 as shown in FIG. 2. Parser module 204 includes a syntax checker (syntaxer) 216, a resolver 218, security module 220, and request cache 222.

The parsing engine components illustrated in FIG. 2 perform the following functions for each SQL request sent to the database system from a client system application:

The request cache 222 stores certain categories of successfully parsed SQL requests and their plastic steps so they can be reused, eliminating the need to parse the same SQL request more than once. The request cache is a parsing engine local in-memory buffer that stores the steps generated during the parsing of a request. The Parser checks the request cache at the beginning of the parsing process, before the syntaxer step, but after the request has been checked for format errors. If it finds a matching cached request, the parser bypasses the syntaxer, resolver, optimizer, and generator steps, performs a discretionary access control security check, if required, and proceeds to the dispatcher stage.

Syntaxer 216 analyzes the high-level syntax of the SQL request statement for errors. If the syntax passes the check, then the SQL request components are converted into a data structure called a parse tree, referred to as a SynTree, which the syntaxer then passes on to resolver 218. The SynTree is also referred to as the Black Tree for the query.

Resolver 218 receives the SynTree and fleshes it out with information about any required data conversions and discretionary access control security checks, adds column names and notes any underlying relationships with other database objects, and then passes the more fleshed-out tree, now known as a ResTree, to query rewrite 206. The ResTree is also referred to as the Red Tree for the query.

Query rewrite 206 receives the ResTree from parser 204 and rewrites the SQL text to prepare it for optimization. Rewriting may include:
  Converting outer joins to inner joins;
  Type 1 and Type 2 View folding;
  Pushing projections into views;
  Pushing conditions into views;
  Satisfiability and transitive closure; and
  Join elimination The query rewrite module then passes the revised, semantically equivalent, ResTree' to optimizer 208.

The optimizer analyzes the ResTree' using various statistical and configuration data about the database and the system hardware components to determine optimum plans to access and join the tables specified by the request. This optimization may include further query rewrites.

The optimizer first checks the statistics cache to see if the statistics it needs have already been retrieved from data dictionary 122. If not, the optimizer retrieves them from the data dictionary. The optimizer then examines any locks placed by the SQL request and attempts to optimize their placement to enhance performance and avoid deadlocks.

An Optimized Parse Tree, transformed from a simple statement tree to a complete operation tree, is then passed to the step generator 210 for further processing. This optimized version of the parse tree is referred to as the White Tree, or Operation Tree, for the request.

Generator 210 creates AMP directives or steps 212, derived from the Optimized Parse Tree, and passes the AMP steps to dispatcher 214 for assignment to the AMPs.

The Dispatcher sequentially, incrementally, and atomically transmits the AMP Steps to the appropriate AMPs for processing.

As stated earlier, a database system may include multiple parsing engines (PEs) for parsing database requests received by the system and generating the execution plans for the requests. If the same request is parsed repeatedly by the same parsing engine, the execution plan generated for the request can be saved in the request cache maintained for that parsing engine to avoid parsing of the same request multiple times.

As illustrated in FIGS. 1 and 2, heretofore, parsing engine request caches were local to each processing engine. If a request has previously been parsed and cached by one PE, other PEs cannot use the cached plan and the request will be parse anew when received by one of the other PEs.

Described now, is a system and method for sharing query plans saved in the request cache of one PE with other PEs, thereby eliminating unnecessarily parsing the same database request in multiple PEs. The solution, utilizes a global request cache partitioned among the parsing engines. This partitioned global request cache (PGRC) includes the local request caches distributed among the processing nodes or processing units of the database system, with requests received by the database system distributed among the local request caches using hashing techniques. To the database system, and processing nodes within the system, the interconnected local caches appear as a single global cache.

Utilizing the partitioned global request cache, one PE parses a received database request and saves the execution plan generated for the request in the global request cache. The saved plan can subsequently be retrieved for use by other PEs, circumventing the need to parse the same request in the other PEs.

A PE can benefit by retrieving and using an execution plan from another PE's cache when a received request has already been parsed by that other PE, and the execution plan created for the request has been saved in that other PE's request cache.

Figure 3:
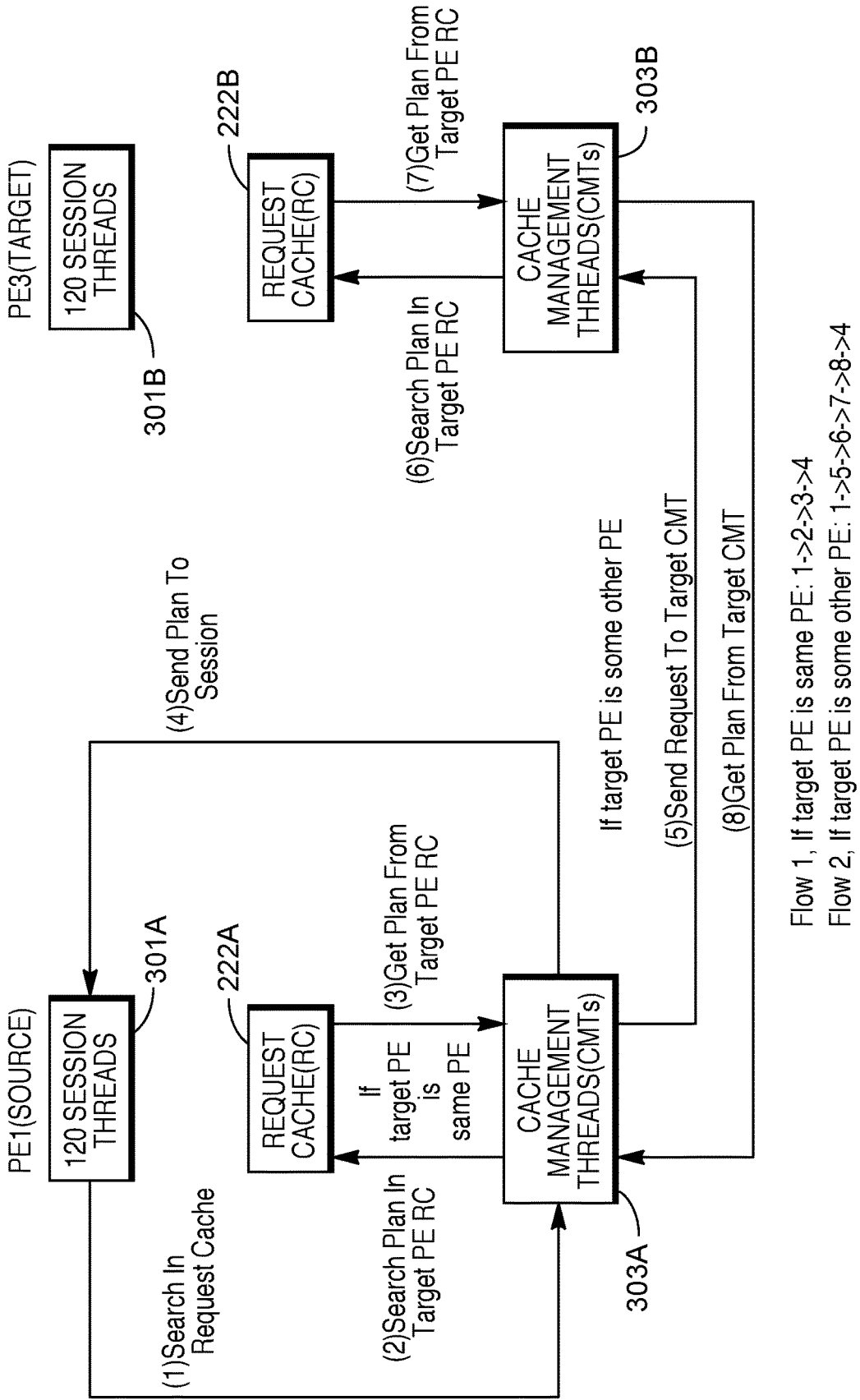
FIG. 3 provides a diagrammatic representation a structure and process for retrieving a stored execution plan from a global request cache, in accordance with the invention.

FIGS. 3 and 4 illustrate the structure and process for retrieving and saving execution plans from and to the partitioned global request cache.

Each PE owns a set of hash values for database requests. Whenever a PE, such as source PE1 shown in FIGS. 3 and 4, receives a request, the source PE parses the received database request, generates an execution plan for the request, and saves the plan on the PE which is the owner of the hash value of the request, referred to as the target PE, e.g., target PE3 shown in FIGS. 3 and 4. All other PEs can obtain the stored execution plan from the cache of the target PE that owns the hash value of the request. To manage the conveyances of execution plans between the PEs, a set of threads, called cache management threads (CMTs), are spawned on each PE.

In the illustrations of FIGS. 3 and 4, database requests are managed in session threads within the parsing engine. Referring to FIG. 3, the process for retrieving an execution plan from the global request cache will now be described.

When a session in source PE1 receives the database request, a session thread 301A from source PE1 directs the request to a local CMT 303A, i.e., a CMT within source PE1 (step 1).

CMT 303A hashes the request to identify the owner of the hash value of the request, i.e., the target PE. The target PE that owns the request can be same PE or some other PE. Each PE acts as an owner for a set of requests based on the hash value of the requests.

If the target PE is the same as the source PE, i.e., source PE1, then CMT 303A searches the local RC 222A (step 2). If the request is found in RC 222A then CMT 303A retrieves the plan from RC 222A (step 3) and shares the plan with session thread 301A (step 4).

If the target PE is some other PE, i.e., target PE3, then the request is sent by CMT 303A to the CMT of the target PE, i.e., CMT 303B of target PE3 (step 5).

CMT 303B searches the request in the RC for target PE3, i.e., RC 222B (step 6). If the request is found in RC 222B, then CMT 303B retrieves the plan from RC 222B (step 7) which is thereafter sent to CMT 303A of source PE1 (step 8). CMT 303A shares the plan with session thread 301A (step 4).

The session in source PE1 waits for a stipulated time to get a plan from target PE3. If the session in source PE1 receives the plan from target PE3 within the stipulated time, the database plan will be executed using the plan retrieved from target PE3. If the plan is not received within the stipulated time, then the session in source PE1 will parse the request to generate an execution plan.

At the end of parsing the request, and if the message from target PE3 has not yet been found or received, then the newly generated plan is sent to target PE3 for storing in RC 222B as shown in FIG. 4.

The process for storing an execution plan generated in response to database request received by a PE, source PE1, within the global request cache, is illustrated in FIG. 4.

When a session in source PE1 receives the database request, a session thread 301A from source PE1 directs the request to a local CMT 303A, i.e., the CMT within source PE1 (step 1).

CMT 303A hashes the request to identify the owner of the hash value of the request, which can be can the same PE, i.e., source PE1, or some other PE.

If the owner of the hash value is the same PE, i.e., source PE1, then the execution plan is saved to the local request cache, RC 222A (step 2).

If the owner of the hash value is some other PE, e.g., target PE3, then the execution plan will be sent CMT 303A to the CMT of the target PE, i.e., CMT 303B of target PE3 (step 3) and saved to the target PE3 request cache 222B.

While this specification contains many specifics, these should not be construed as limitations on the scope of the disclosure or of what may be claimed, but rather as descriptions of features specific to particular implementations of the disclosure. For example, FIG. 1 illustrates a parallel database system including multiple processing nodes and parsing engines. However, the invention can be utilized within other forms of relational or non-relational database systems or diverse computing environments assimilating multiple, different, processing systems and data types.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of improving the performance of frequently executed queries in a database system comprising multiple processing units, each unit including a parsing engine for receiving database queries and generating database execution plans in response thereto, the method comprising:

saving in a distributed global request cache, said distributed global request cache being accessible to said parsing engines, prior generated execution plans corresponding to prior received database queries, wherein each parsing engine includes a respective local request cache, wherein each parsing engine selectively communicates with each of the other parsing engines, and wherein the distributed global request cache comprises each said respective local request cache collectively;

receiving by one of said parsing engines a new database query to be executed;

comparing said new database query to said prior received database queries;

when said new database query is equivalent to one of said prior received database queries, retrieving the execution plan corresponding to said one of said prior received database queries from a respective local request cache of said distributed global request cache of a different parsing engine and executing said retrieved execution plan; and when said new database query is not equivalent to one of said prior received database queries, parsing, by said one of said parsing engines, said new database query to generate a new execution plan corresponding to said new database query, and executing said new execution plan.

2. The method in accordance with claim 1, further comprising:

storing said new execution plan in said distributed global request cache.

3. The method in accordance with claim 1, wherein:

said prior and new execution plans saved to said distributed global request cache are allocated to said local request caches using hash values determined for said corresponding prior received and new database queries.

4. A database system, comprising:

a storage device, wherein the storage device stores a plurality of instructions;

multiple processing nodes wherein each processing node comprises at least one processor, each node including a parsing engine for receiving database queries and generating database execution plans in response thereto; and a distributed global request cache for storage of prior generated execution plans corresponding to prior received database queries, said distributed global request cache being accessible to said parsing engines, wherein each parsing engine includes a respective local request cache, wherein each parsing engine is able to communicate with each of the other parsing engines, and wherein the distributed global request cache comprises each said respective local request cache collectively, wherein the plurality of instructions is executed by at least one of said parsing engines to:

receive a new database query to be executed;

compare said new database query to said prior received database queries;

when said new database query is equivalent to one of said prior received database queries, retrieve the execution plan corresponding to said one of said prior received database queries from a respective local request cache of said distributed global request cache of a different parsing engine; and when said new database query is not equivalent to one of said prior received database queries, parse said new database query to generate a new execution plan corresponding to said new database query.

5. The database system in accordance with claim 4, wherein:

said the plurality of instructions is further executed by the at least one of said parsing engines to save said new execution plan in said distributed global request cache.

6. The database system in accordance with claim 4, wherein:

said prior and new execution plans saved to said distributed global request cache are allocated to said local request caches using hash values determined for said corresponding prior received and new database queries.

* * * * *